May 30, 1961
G. L. MANDAVILLE
2,986,068
PHORIA METER
Filed July 19, 1955
3 Sheets-Sheet 1
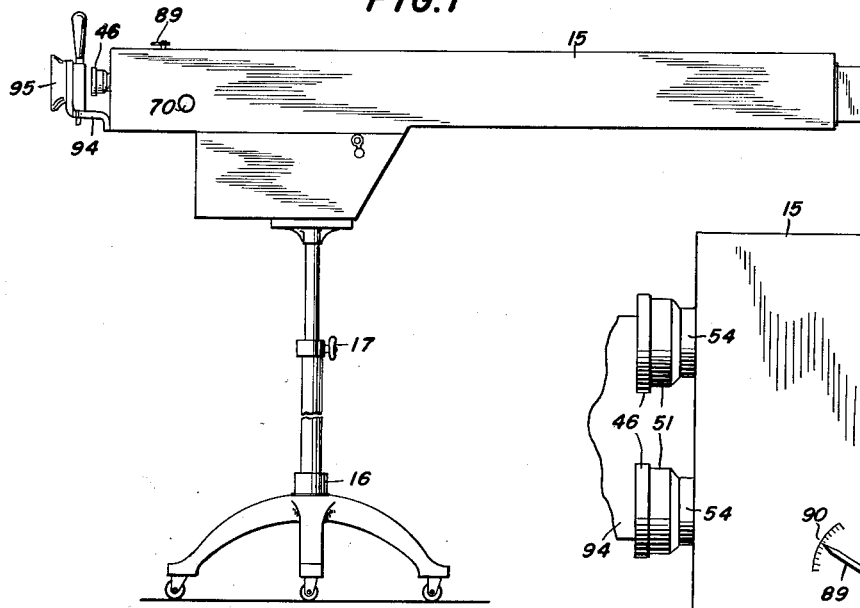
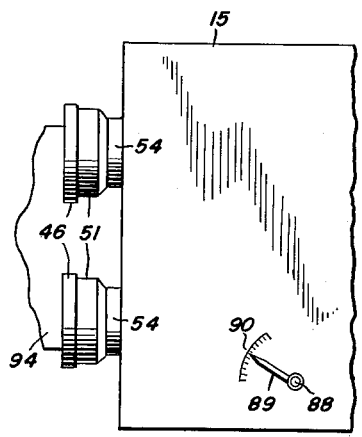
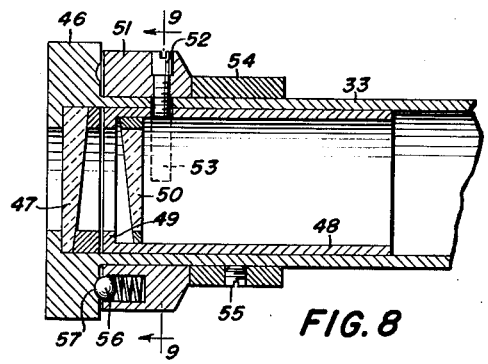
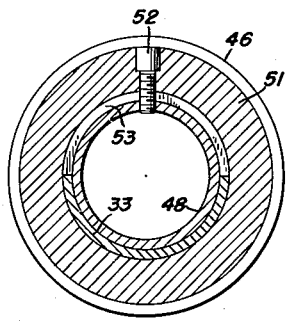
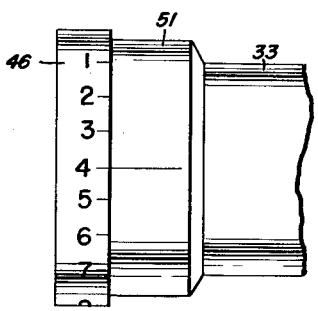
INVENTOR.
G. L. MANDAVILLE
BY
*Estabrook & Estabrook*
ATTORNEYS

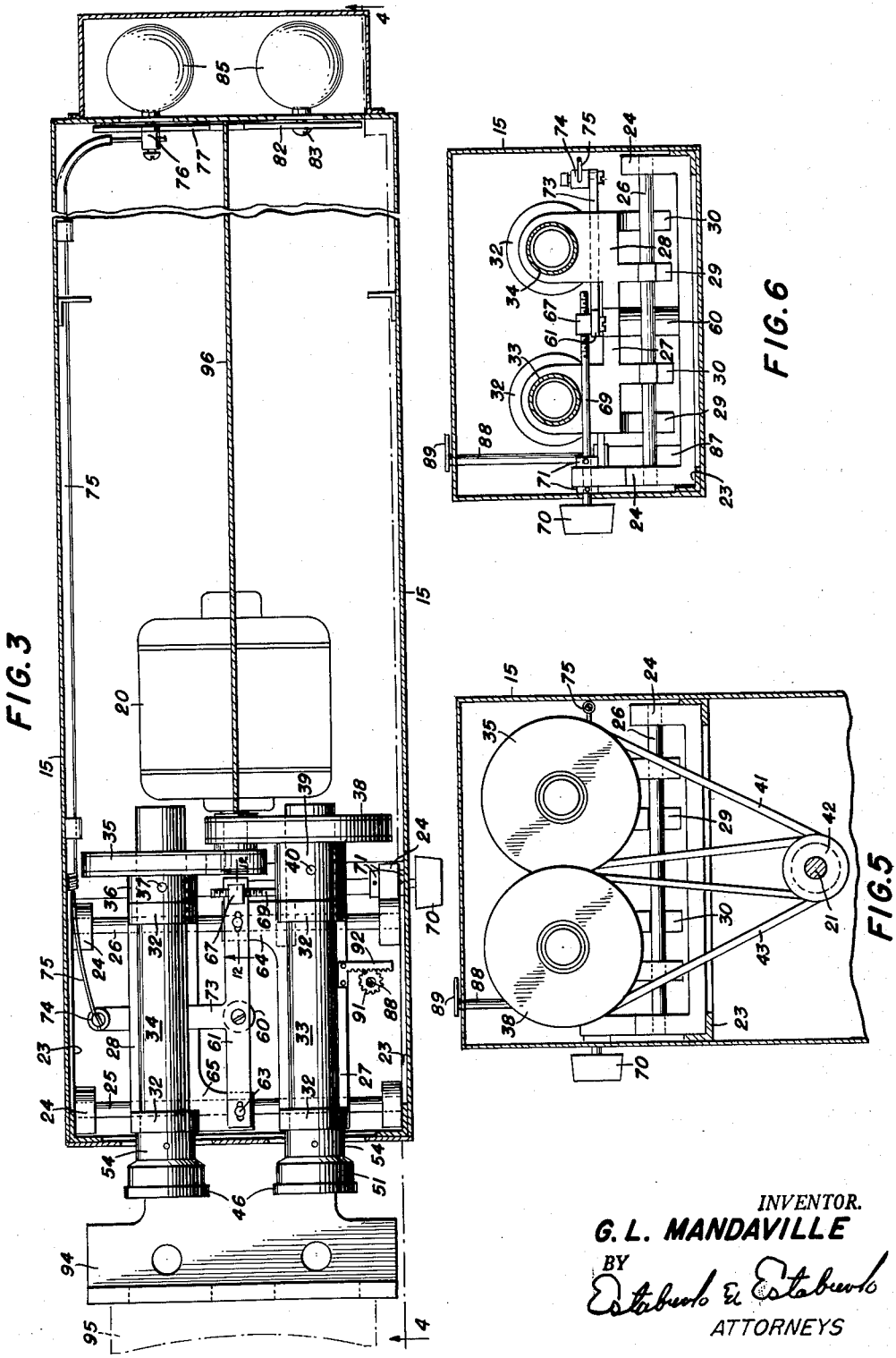

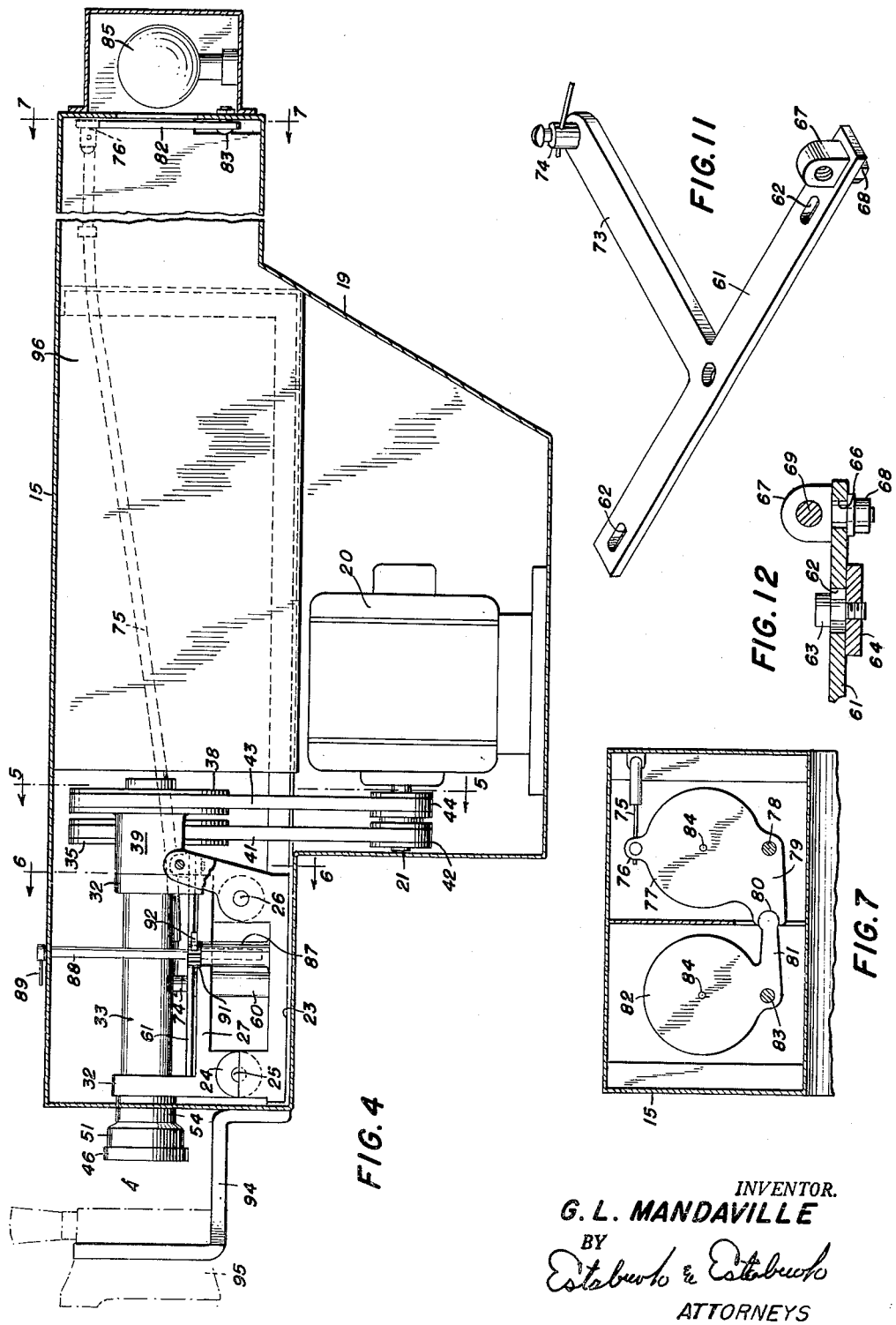

United States Patent Office 2,986,068
Patented May 30, 1961

2,986,068
PHORIA METER
Gurney L. Mandaville, 311 Orange Ave., Fort Pierce, Fla.
Filed July 19, 1955, Ser. No. 522,903
4 Claims. (Cl. 88—20)

The present invention relates broadly to an instrument or device for testing and exercising the eyes and more specifically to an improved phoria meter or device.

The instrument of the present invention provides a means of and a method for measuring the phorias or the relationship, one to the other, of two lines extending from the maculae through the optical centers of the two eyes, thereby enabling the prescribing of lens with prismatic power to overcome any deviation from orthophoria or parallelism. In addition the instrument provides a visual training means whereby the duction powers controlling the movement of the eyes can be developed as required for more efficient vision.

One of the objects of the present invention is to provide an improved instrument for obtaining both the vertical and horizontal phorias in one measurement.

Another object is to provide a device having pairs of coacting prisms rotatable at a speed to cause a small spot of light to appear as a circle.

Another object is to provide a device having pairs of rotatable coacting prisms with means for adjusting one prism with respect to the other to regulate and control the prismatic power.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the preferred embodiment of the invention is illustrated:

Figure 1 is a side elevational view of the instrument or device of the present invention;

Figure 2 is an enlarged top plan view of a fragmentary portion of the instrument of the present invention;

Figure 3 is a top plan view of the instrument of the present invention with the top surface of the housing removed and showing the rotatable prism cylinders and the actuating means for adjusting the target shields adjacent a light source;

Figure 4 is a vertical sectional view of the instrument showing the motor and drive means for rotating the prism cylinders, the view being taken on a plane indicated by the line 4—4 of Figure 3;

Figure 5 is a cross-sectional view of the instrument showing the driving pulleys for rotating the prism cylinders, the view being taken on a plane indicated by line 5—5 of Figure 4;

Figure 6 is a cross-sectional view of the instrument showing mechanism for adjusting one prism cylinder with respect to the other, the view being taken on a plane indicated by line 6—6 of Figure 4;

Figure 7 is a cross-sectional view of the instrument showing the target like shutters or shields which are located at one end of the housing, the view being taken on a plane indicated by the line 7—7 of Figure 4;

Figure 8 is an enlarged vertical sectional view of a fragmentary portion of one of the pairs of rotating prism cylinders showing the manner in which one cylinder is adapted to be rotatably adjusted with respect to the other to vary the prismatic power of the prisms.

Figure 9 is a cross-sectional view of one of the pairs of prism cylinders, the view being taken on a plane indicated by the line 9—9 of Figure 8;

Figure 10 is a side elevational view of a fragmentary end portion of one of the prism cylinders;

Figure 11 is a perspective view of the connecting lever or member which controls the pupillary spacing between the pairs of prism cylinders and the illuminated targets; and Figure 12 is a vertical sectional view of a fragmentary portion of the connecting lever or member showing it connected to one of the prism cylinders, the view being taken on a plane indicated by the line 12—12 of Figure 3.

Referring to the drawings there is shown in Figure 1 a phoria meter of the present invention, embodying a housing 15 which has secured to the bottom surface thereof, in any suitable manner, a pedestal support 16. The pedestal support 16 is of the telescoping type so that through a suitable wing nut 17 the housing 15 may be raised or lowered for properly positioning the instrument in front of the patient to be examined. The housing 15 is provided with a depending recessed portion within which is positioned an electric motor 20, Figure 4. The motor 20 is provided with a suitable cord, not shown, for connecting same to a source of electric power for rotatably driving the armature shaft 21 at a sufficient number of r.p.m.

The housing 15 has mounted therein, at the forward end thereof, a platform or base member 23 of rectangular configuration, Figure 3, which is provided adjacent each corner thereof with an upwardly projecting support or stanchion 24. A rod 25 is mounted in the stanchions 24 along the forward edge of the base member 23 and extends from one side of the housing 15 to the other side, while a similar rod 26 is mounted in the stanchions 24 and arranged to extend across the rear edge of the base member 23. The rods 25 and 26 have slidably mounted thereon a pair of platforms 27 and 28. The platforms 27 and 28 are formed with depending bosses 29 and 30 at their inner and outer ends, respectively, through which extend the rods 25 and 26, respectively, to facilitate the sliding adjustment or movement of platforms 27 and 28 towards and from one another.

The platforms 27 and 28 are each formed with a pair of upwardly projecting bearing supports 32, Figures 3 and 4, which are located adjacent the inner and outer ends of each of said platforms. The bearing supports 32 on the platform 27 have mounted therein, for rotative movement, an outer prism carrying hollow cylinder 33, while the bearing supports 32 on the platform 28 have mounted therein, for rotative movement, an outer prism carrying hollow cylinder 34. The inner end of the prism carrying cylinder 34 has mounted thereon, for rotation therewith, a pulley 35 which is provided with an integrally formed hub 36 that is secured to the cylinder 34 by a set screw 37. The other cylinder 33 also has secured to the inner end thereof a pulley 38 which is formed with a hub 39 that is secured to the cylinder by a suitable set screw 40.

The hubs 36 and 39 maintain their respective pulleys in proper spaced relation with respect to the bearing supports 32. The hub 39 of pulley 38 is of a greater length than the hub 36 of pulley 35, so that while the two pulleys are arranged in spaced parallel planes with respect to one another, a portion of one pulley will overlap a portion of the other pulley, Figure 3. The pulley 35 has entrained thereabout a belt 41 which is also entrained about a pulley 42 secured to the outer end of the armature shaft 21 of the motor 20. The pulley 38 has entrained thereabout a belt 43 which is also entrained about a pulley 44 that is secured to the armature shaft 21 of the motor 20 intermediate the motor housing and the pulley 42. Thus upon rotation of the motor or armature shaft 21 the prism carrying cylinders 33 and 34 will be rotatably driven in their bearing supports 32 by means of the belts 41 and 43 entrained over the respective pulleys and in this manner the prism carrying cylinders 33 and 34 will be rotated at the same speed.

The outer prism carrying cylinders 33 and 34 each have an enlarged hub or flange 46 formed on the outer end thereof, and said end portion of each of the cylinders is adapted to project through a suitable opening in the end of the housing 15, as shown in Figures 3 and 4. The cylinder 33, Figure 8, has a prism 47 mounted therein within the plane of the flange 46. The outer cylinder 33 has mounted therein an inner hollow cylinder 48 which is provided at its forward end with an inturned annular flange 49 that defines or forms a seat for a prism 50. The inturned annular flange 49 of the inner cylinder 48 is spaced only a slight distance from the prism 47 so that the two prisms are positioned in very close relation to one another within the cylinder 33.

The outer cylinder 33 has rotatably mounted thereon, in abutting engagement with the flange 46, a collar 51 which is provided with a set screw 52 that extends through a slot 53 in the outer cylinder 33 and through a suitable aperture in the inner cylinder 48. Thus upon rotation of the collar 51 upon the outer cylinder 33 the inner cylinder 48 will be rotated within the outer cylinder which movement causes the prism 50 to be rotatably adjusted with respect to the prism 47, thus varying or changing the prismatic power of the two cylinders. A spacing collar 54 is secured to the outer cylinder 33 by a suitable set screw 55 for properly positioning and maintaining the flange 46 of the outer cylinder in spaced relation with the forward bearing supports 32 on the platforms 27 and 28 respectively. The collar 51 is provided with a spring actuated ball member 56 that is adapted to engage suitable spaced indentations 57 provided on the coacting face of the flange 46. As shown in Figure 10, the flange 46 of the outer cylinder 33 is provided with suitable indicia designating or denoting the spacing of the indentations 57 so that in moving the collar 51 from one extreme position to the other the prism 50 and the inner cylinder 48 will be rotated through an arc of 180° so as to vary or rotatably change the position of the base of the prisms 50 and 47 as well as the position of the apexes of said prisms. When the inner cylinder and prism have been rotated the desired distance or number of degrees the ball member 56 will engage one of the indentations 57 in the flange 46 for retaining or locking the inner cylinder in its adjusted position with respect to the outer cylinder. It is to be understood that cylinder 34 is identical in all respects to cylinder 33 and cylinder 34 also has a hollow cylinder disposed therein in the same manner as cylinder 48 is positioned within cylinder 33.

The base member 23 has mounted in the center thereof, Figures 3 and 6, an upwardly projecting post or pillar 60 which has the central portion of a lever 61 pivotally mounted thereon, in a plane parallel to the base member. The lever 61 is formed adjacent its respective ends with slots 62, Figure 12, through which project suitable pins 63, Figure 3, for threaded engagement with inwardly projecting portions or webs 64 and 65 formed on the platforms 27 and 28 respectively. That is, one end portion of the lever 61 is connected to the inwardly projecting web portion 64 of the platform 27, while the other end portion of the lever 61 is connected to an inwardly projecting web portion 65 of the platform 28. Thus a pivotal movement of the lever 61 in a horizontal plane will cause the platforms 27 and 28 to move either towards or away from one another. This movement of the platforms is due to the depending bosses 29 and 30 sliding along the rods 25 and 26. The use of slots 62 in the end portions of the lever 61 insures a loose fit or connection between the ends of the levers and the web portions 64 and 65 of the platforms 27 and 28. Such an arrangement permits the lever to pivot about its central support and still cause the platforms to have a sliding reciprocatory movement on the rods 25 and 26 without any binding occurring at the connection of the web portions with the ends of the lever.

The innermost end of the lever 61, Figures 11 and 12, is provided with a second slot 66 through which projects the stem of a boss 67. The boss 67 is mounted on the end of lever 61, for a loose pivotal movement with respect thereto, by means of a suitable washer and nut 68 threaded on the stem of the boss 67. The boss 67 is formed with a threaded aperture for receiving the theaded end of a rod 69, which rod extends beneath the outer cylinder 33, Figure 6, and through a suitable aperture provided in one of the stanchions 24, Figure 4. The rod 69 projects through a side of the housing 15 and has a suitable knob 70, Figure 3, affixed to the outer end thereof, so that upon rotation of the knob the rod 69, through its threaded engagement with the boss 67, will cause the lever 61 to pivot on the pillar 60 and in turn move the platforms 27 and 28, with their prism carrying cylinders, toward or away from one another. A pair of collars 71, Figure 6, are secured to the rod 69 on opposite sides of the stanchion 24 to prevent reciprocatory movement of the rod with respect to the stanchion 24.

The lever 61 has projecting outwardly from the center or central portion thereof an arm 73, Figures 3 and 11. The arm 73 is formed integrally with the lever 61 and extends therefrom in a plane normal thereto and parallel to the base member 23. The outwardly extending portion or arm 73 of the lever 61 projects beneath the outer cylinder 34, but above the platform 28 and has mounted on the free end thereof a suitable binding post 74, Figures 3 and 11. The binding post 74 has one end of a wire or cable 75 secured thereto which cable is adapted to extend along the inner face of one side of the housing 15 towards the rear end of the housing, see Figure 3. Suitable brackets, not shown, may be provided on the side wall of the housing 15 for supporting the cable 75.

The free end of the wire or cable 75 is connected to an outwardly projecting lip 76 formed on the top edge portion of a target shield 77, Figure 7. The target shield 77 is pivotally mounted upon a pin 78 that extends through the bottom or base portion of the shield and engages a suitable flange, not shown, provided in the housing 15. The base portion of the target shield 77 is formed with a radially extending arm 79 having a socket 80 that engages a complementary enlarged end portion provided in an outwardly projecting arm 81 formed on the bottom portion of a second target shield 82. The second target shield 82 is pivotally mounted upon a pin 83 that extends through the bottom portion of the shield and engages a flange, not shown, in the housing 15. Thus the target shields 77 and 82 are pivotally mounted upon pins 78 and 83, respectively, and through the arm and socket connections 79 and 81 are capable of moving toward and away from one another upon the action of the cable 75. The target shields 77 and 82 are each provided with a light emitting hole 84 in the central portion thereof. The housing 15 is provided with a rearwardly extending portion, Figures 3 and 4, within which are mounted lamps 85. The lamps 85 are provided with suitable means, not shown, for connecting to a source of power whereby said lamps may be illuminated when the instrument is operated in order to direct a narrow beam of light through the holes 84 towards the prism cylinders at the front end of the housing 15.

The base member 23 is provided with an upwardly projecting socket member 87 that is located between the housing 15 and the platform 27, Figures 4 and 6. The socket member 87 has a vertically extending rod 88 mounted therein, which rod projects through the top surface of the housing 15 and has secured to the end thereof a suitable pointer 89 for moving over a scale 90 provided on the outer face of the top cover of the housing 15, Figure 2. The rod 88 is provided with a pinion 91 which engages a rack 92 that is secured to and projects outwardly from the platform 27. Thus upon rotation of the knob 70 the platforms 27 and 28 will be moved towards or from one another through the pivotal movement of the lever 61, and upon the movement of the platform 27 the rod 88 will be rotated and the pointer caused to move over the scale 90 to indicate the pupillary spacing between the prisms in cylinder 33 from the prisms in cylinder 34. This movement of the lever 61 will also cause the target shields 77 and 82 to move toward or away from one another about their pivot pins so that there will be the same spacing between the light holes in the target shields as there is between the prisms in cylinders 33 and 34. Thus the pointer 89 and scale 90 will provide a reading for the target shields as well as the cylinders.

As shown in Figures 1 and 4, the forward end of the housing 15 has secured thereto a platform 94. The platform 94 has mounted thereon, by any suitable means, a head rest 95 which is spaced a sufficient distance from the flanges 46 of the outer cylinders 33 and 34 to permit the insertion or positioning between said flange and head rest of a suitable phorometer or measuring prisms. The measuring prisms are of the conventional type usually employed by an optician or oculist so that upon adjustment through suitable handles provided on the instrument the vertical and horizontal phoria measurements may be obtained.

The housing 15 is provided with a vertically extending partition 96, Figure 3, which extends from the inner ends of the cylinders 33 and 34 to the target shields 77 and 82 so as to divide the housing into two chambers or compartments.

In the use of the present invention the housing 15 is placed before a patient so that the forehead of the patient engages the head rest 95. The lamps 85 are then illuminated after which the knob 70 is rotated in either a clockwise or a counter-clockwise direction. The rotation of the knob 70 causes the rod 69 to rotate, which moves the lever 61 upon its pivot on the post 60, which in turn moves the platforms 27 and 28, carrying the cylinders 33 and 34, and in turn the target shields 77 and 82 through the arm 73 and cable 75. The movement of the platform 27 causes rod 88 to be rotated, thus moving the pointer 89 over the scale 90 on the housing 15 thus indicating the pupillary spacing between the prisms in cylinder 33 from those in cylinder 34, as well as the spacing between the light holes 84 in the target shields 77 and 82.

The inner cylinder 48 within cylinder 33 is then rotated by means of collar 51 so as to vary the relation of the prism 50 in the inner cylinder 48 with the prism 47 in the outer cylinder 43. The same procedure is followed with respect to cylinder 34 and the prisms within this cylinder, however, the relation of the prisms carried by one of the cylinders 33 or 34 should be greater than the relation between the prisms carried by the other cylinder. This variance of adjustment of the prisms in one pair of cylinders with respect to the prisms in the other pair of cylinders will tend to produce a large circle of light through one of the pairs of cylinders, while a small circle of light will be produced by the other pair of cylinders. This variance in the size or diameter of the circles is due to the variance in the relationship of the two coacting prisms in a pair of cylinders so that the prismatic power of the prisms can be varied from zero to maximum. Thus by having a slight variation of the prismatic power in one pair of cylinders and a greater variation of prismatic power in the other pair of cylinders the cylinder with greater variation will produce a circle of greater diameter than the one with the smaller prismatic variation.

Thus upon energization of the motor 20 the prism carrying cylinders 33 and 34 with the inner cylinders 48 properly adjusted therein will be rotated as a unit. That is, the inner cylinders 48 will be rotated with their respective outer cylinders 33 and 34 and said cylinders will be rotated at such a rate of speed that the pin point of light emanating through the light hole 84 in each of the target shields 77 and 82 will appear as a circle rather than as a pin point of light. If the eyes of the patient are in proper focus and parallelism the rotating circles of light will merge together and with one of the circles being larger than the other the smaller circle will be disposed within the larger outer circle. However, if the rotating circles of light, as they appear to the patient's eyes, are separated or spaced so that the smaller circle does not appear to be in the center of the larger circle then the measuring prisms positioned between the head rest and the flanges of the cylinders 33 and 34 must be adjusted to compensate for the necessary vertical or horizontal phoria condition that is required to have the smaller circle move into the larger circle as viewed by the patient being examined.

It is to be understood that there is no actual movement of the light source, but due to the prismatic power of one pair of cylinders being at a variance with the prismatic power of the other pair of cylinders, the rapid or high speed rotation of the cylinders gives the impression or appearance to the patient that the spot of light is moving in a circle and as a continuous circle with one circle being larger than the other circle. Thus when the phorias are not perfect it is necessary to adjust the measuring prisms by means of the necessary vertical and horizontal adjustment means to move the small circle of light so that it will appear to be within the center of the large circle of light.

The present instrument not only permits the measurement of phorias, but also serves as a means for exercising and training the eyes through the movement of the eye as it follows the circle of light. It is to be understood, of course, that first one eye and then the other may be examined by varying the prismatic power of each pair of rotating cylinders so that in one instance the left eye would be locating or following the small circle of light, while the right eye is following the large circle of light and the exact converse could then be followed through the necessary adjustment of the prisms by rotating the collar 51 for moving the inner cylinder with respect to its respective outer cylinder.

I claim:

1. In a device of the type described, a housing, a base member positioned therein, a pair of coacting platforms slidably mounted on said base member, a hollow cylinder having a fixed and an adjustable prism therein rotatably mounted on each of said platforms, means mounted in said housing and operatively connected to said cylinders for rotating same, a source of light in said housing spaced from said base member, target shields pivotally mounted in said housing and interposed between said cylinders and the source of light, each of said shields having an aperture therein for emitting a narrow beam of light in line with said cylinders, adjusting means on said base member for moving said platforms toward and away from one another and means connecting said target shields with said adjusting means for pivotally moving said target shields in unison with said platforms.

2. In a device of the type described having a housing, a base member positioned in one end of the housing, a pair of platforms slidably mounted on said base member, a hollow cylinder having a prism fixed therein positioned on each of said platforms for rotative movement thereon, a source of light positioned at the other end of said housing, target shields interposed between said source of light and said platforms, said target shields being pivotally mounted in said housing adjacent said source of light and having openings for emitting a narrow beam of light to said cylinders, a second hollow cylinder having a prism fixed therein positioned within each of said first hollow cylinders for rotation therewith, means rotatably mounted on said first cylinders and engageable with the second cylinders for rotating the second cylinders within the first cylinders to vary the prismatic power of the prisms in said cylinders, adjusting means on said base member for varying the spacing between said platforms and means connecting said target shields with said adjusting means for varying the spacing between the openings in said target shields contemporaneously with the movement of said platforms.

3. In a device of the type described having a housing, a base member positioned in one end of the housing, a pair of platforms slidably mounted on said base member, a hollow cylinder having a prism fixed therein positioned on each of said platforms for rotative movement thereon, a source of light positioned at the other end of said housing, target shields interposed between said source of light and said platforms, said target shields being pivotally mounted in said housing adjacent said source of light and having openings for emitting a narrow beam of light to said cylinders, a second hollow cylinder having a prism fixed therein positioned within each of said first cylinders for rotation therewith, means rotatably mounted on said first cylinders and engageable with the second cylinders for rotating the second cylinders within the first cylinders to vary the prismatic power of the prisms in said cylinders, adjusting means on said base member for varying the spacing between said platforms, means connecting said target shields with said adjusting means for varying the spacing between the openings in said target shields contemporaneous with the movement of said platforms, a motor in said housing, driving means connecting said cylinders with said motor for rotating said cylinders to produce a representation of a circle when viewing through the prisms in each of said first and second cylinders.

4. In a device of the type described having a housing, a base member positioned in one end of the housing, a pair of platforms slidably mounted on said base member, a hollow cylinder having a prism fixed therein positioned on each of said platforms for rotative movement thereon, a source of light positioned at the other end of said housing, target shields interposed between said source of light and said platforms, said target shields being pivotally mounted in said housing adjacent said source of light and each having an opening for emitting a narrow beam of light to a cylinder, a second hollow cylinder having a prism fixed therein positioned within each of said first cylinders for rotation therewith, means rotatably mounted on said first cylinders and engageable with the second cylinders for rotating the second cylinders within the first cylinders to vary the prismatic power of the prisms in said cylinders, a lever pivotally mounted on said base member, one end portion of said lever being connected to one of said platforms and the other end portion being connected to the other of said platforms, an arm formed integrally with said lever and projecting from the central portion thereof in a plane normal thereto, a cable connected to said arm and one of said target shields, a shaft rotatably supported on said base member and connected to said lever, means for rotating said shaft to vary the pupillary spacing between the cylinders on said platforms and the openings in said target shields and means in said housing connected to each of said first named cylinders for rotating same.

References Cited in the file of this patent

UNITED STATES PATENTS

| | | |
|---|---|---|
| 942,393 | Konig | Dec. 7, 1909 |
| 1,003,064 | Phillips | Sept. 12, 1911 |
| 1,093,639 | MacDougall | Apr. 21, 1914 |
| 1,455,011 | Thompson | May 15, 1923 |
| 1,543,188 | Poser | June 23, 1925 |
| 1,949,022 | Mandaville | Feb. 27, 1934 |
| 2,041,719 | Loy | May 26, 1936 |
| 2,089,863 | Updegrave | Aug. 10, 1937 |
| 2,186,418 | Mandaville | Jan. 9, 1940 |
| 2,664,885 | Mandaville | Jan. 5, 1954 |
| 2,701,981 | Rutt | Feb. 15, 1955 |
| 2,712,773 | Merrick | July 12, 1955 |
| 2,831,481 | Radin | Apr. 22, 1958 |

FOREIGN PATENTS

| | | |
|---|---|---|
| 346,235 | Great Britain | Apr. 9, 1931 |